United States Patent
Nulty

[11] Patent Number: 5,982,412
[45] Date of Patent: Nov. 9, 1999

[54] COAXIAL TESTING AND PROVISIONING NETWORK INTERFACE DEVICE

[75] Inventor: Gregory M. Nulty, Gibsonia, Pa.

[73] Assignee: Tollgrade Communications, Inc., Cheswick, Pa.

[21] Appl. No.: 08/981,179

[22] PCT Filed: Jun. 14, 1996

[86] PCT No.: PCT/US96/10310

§ 371 Date: Dec. 12, 1997

§ 102(e) Date: Dec. 12, 1997

[87] PCT Pub. No.: WO97/00571

PCT Pub. Date: Jan. 3, 1997

Related U.S. Application Data

[60] Provisional application No. 60/003,337, Jun. 16, 1995.

[51] Int. Cl.[6] .................................................. H04N 7/10
[52] U.S. Cl. ................................. 348/6; 379/27; 455/3.1
[58] Field of Search .................................. 379/27, 29, 28, 379/22, 24, 10, 14–17; 348/6, 8, 10, 12, 13, 14; 455/3.1, 5.1, 6.1, 6.2, 6.3; 370/352, 354

[56] References Cited

U.S. PATENT DOCUMENTS

| | | |
|---|---|---|
| 3,968,327 | 7/1976 | Gregg, III . |
| 4,207,431 | 6/1980 | McVoy . |
| 4,408,227 | 10/1983 | Bradley ..................................... 358/139 |
| 5,157,662 | 10/1992 | Tadamura et al. ....................... 370/352 |
| 5,181,107 | 1/1993 | Rhoades . |
| 5,381,459 | 1/1995 | Lappington . |
| 5,414,773 | 5/1995 | Handelman . |
| 5,421,030 | 5/1995 | Baran . |
| 5,479,202 | 12/1995 | Beriont .......................................... 348/7 |
| 5,537,141 | 7/1996 | Harper et al. .............................. 348/12 |
| 5,630,204 | 5/1997 | Hylton et al. ............................. 455/3.3 |
| 5,684,799 | 11/1997 | Bigham et al. .......................... 370/397 |
| 5,689,553 | 11/1997 | Ahuja et al. ............................. 379/202 |
| 5,872,779 | 2/1999 | Vaudreuil ................................. 370/352 |

*Primary Examiner*—Andrew I. Faile
*Assistant Examiner*—Uyen Le
*Attorney, Agent, or Firm*—Webb Ziesenheim Logsdon Orkin & Hanson, P.C.

[57] ABSTRACT

A broadband network for providing broadband signals, such as cable television signals, to a subscriber location includes a network interface device installed at the subscriber's end of the broadband network. The network interface device includes circuitry that provides for the selective provisioning of services to the subscriber location from the broadband network and a test circuit that can be selectively connected for testing signals appearing on the broadband network.

22 Claims, 5 Drawing Sheets

COAXIAL TESTING AND PROVISIONING NETWORK INTERFACE DEVICE

This appln is a 371 of PCT/US96/10310 filed Jun. 14, 1996. This appln also claims the benefit of U.S. Provisional Appln No. 60/003,337 filed Jun. 16, 1995.

BACKGROUND OF THE INVENTION

1) Field of the Invention

This invention relates to the cable television field and, more particularly, to methods and devices for testing and provisioning a cable television system.

2) Background Art

The cable television (CATV) industry has evolved over the years from just providing remote areas with television signals, to a full-fledged industry providing entertainment to the home. During this evolution, technology has increased in complexity with reverse channel capability and bandwidth growing from 400 MHz to 750 MHz, and now to 1 GHz. The quality of signals has also improved with the deployment of fiber optic systems which drive the signals deep into each neighborhood. From there the signal is carried on coaxial cable, and tapped for the customer drop. Even with the evolution of the technology in signal quality and channel carrying capacity, there are a number of routine testing and provisioning activities which still require a costly dispatch to handle.

Testability of the coaxial signal quality at the customer interface is still an on-site type of test procedure. While trunk and feeder coaxial signals have been capable of remote monitoring for years, tests on the coaxial cable drop today are usually a manual function requiring a technician to visit the customer and perform diagnostics using portable test equipment. This is undesirable from a service standpoint since it can take a protracted amount of time for a technician to be dispatched, identify the trouble and repair it if required. From a network operator's standpoint, the customers' coaxial cable drops may represent over 50% of the deployed miles of coaxial cable in a newer broadband delivery system, which makes these drops a prime target for testability.

In previous methods for measuring the quality of the CATV signals, many alternatives have been proposed. One such example is shown in U.S. Pat. No. 4,207,431. In this patent, centralized monitoring of a CATV system is proposed using monitoring points in the network and sending a signal back to a central location using the reverse channel transmission capability within the CATV system itself. This patent, however, does not disclose circuitry for monitoring the output of a communications system and transmitting such output over either the telephone network or the broadband network.

Provisioning issues associated with the churn rate of customers and illegal connections to the system are a major concern. Even with a small monthly percentage of churn, the number of dispatches required for disconnects and reconnects equates to a sizable annual maintenance and administrative expense. Additionally, the lost monthly revenue associated with illegal connections to the CATV system can amount to a significant lost profit potential. Even with a low churn rate and a small percentage of illegal connections, these costs can amount to millions of dollars per year.

In the past, to achieve activation and deactivation of signals in a CATV system, many systems have been proposed. One such example is the television signal distribution exemplified in U.S. Pat. No. 3,968,327. This patent describes a centralized system for remotely enabling or disabling the viewing of special transmitted signals in a coaxial cable distribution system using the telephone network for communications. This apparatus allows the display of selected channels on selected receivers, but does not interfere with the other nonselected transmitted channels. This patent, however, does not disclose circuitry for enabling and disabling the entire transmit and receive capability of a coaxial delivery system to selected subscribers.

It is an object of the present invention to provide an apparatus for the provisioning of signals on a broadband coaxial network to customer equipment from a remote location utilizing one or a combination of the broadband network and a telephone network.

It is a further object of the present invention to provide an apparatus for testing one or a combination of the broadband network and customer equipment from a remote location utilizing one or a combination of the broadband network and the telephone network.

SUMMARY OF THE INVENTION

Accordingly, I have invented a provisioning and control apparatus for use in a communications system. The apparatus includes a first network interface unit for facilitating communication between a first communication network and an end use apparatus utilizing a first transmission medium, such as a coaxial wire. A second network interface unit facilitates communication between a second communications network and the first network interface utilizing a second transmission medium, such as a telephone wire. A central control and testing center is connected between the first and second communications networks for transmitting and receiving a signal utilizing at least one of the first and second transmission mediums. The first network interface unit is connected for receiving the signal from the central control and testing center on one of the first and second transmission mediums and for responding thereto by transmitting a response signal to the central control and testing center utilizing the other of the first and second transmission mediums.

In accordance with the invention, the first network interface unit further includes means for receiving the signal on one of the first and second transmission medium and for responding thereto utilizing the one of the first and second transmission medium. A transceiver of the end use apparatus facilitates communication between the end use apparatus and at least one of the first and second communication networks through one of (i) the respective first and second network interface units or (ii) the first network interface unit. A means is provided for connecting the first communication network to one of the end use device and a termination in response to receipt of a control signal transmitted on one of the first and second transmission medium. The first network interface unit includes a grade of service device and a reverse transmission filter that are selectably connectable between the first communication network and the end use device in response to the control signal. The first network interface unit also includes a test circuit for testing the quality of signals from at least one of the first communication network and the end use device. The test circuit is connectable to at least one of the first communication network and the end use device in response to the control signal.

Moreover, in accordance with another perspective of the invention, I have invented a network interface unit for connection between a telephone network and a broadband network. The network interface unit includes a telephone network communication option for transmitting and receiving telephone signals over the telephone network and for converting telephone signals to digital signals. A controller is connected to the telephone network communication option for receiving digital signals therefrom. A switching means is connected between the broadband network and the controller. The controller causes the switching means to selectively connect or disconnect the broadband network to or from the customer equipment in response to the receipt of a telephone signal by the telephone network communication option.

In accordance with the invention, the network interface unit includes a termination connected to the switching means and a test circuit connected between the controller and the switching means. The controller causes the switching means, in response to the receipt of a telephone signal by the telephone network communication option, to connect the broadband network to one of the termination and the customer equipment; and/or connect the test circuit to the broadband network and the customer equipment. The test circuit converts a signal on the broadband network into a digital signal for use by the controller in measuring the quality of signals on the broadband network. A means is provided for selecting the frequency of the signal to be converted to a digital signal. The controller further includes means for isolating the customer equipment from the broadband network and the test circuit and means for isolating the broadband network from the customer equipment and the test circuit. The controller includes means for transmitting digital signals to the telephone communications option wherein the digital signals are converted to telephone signals for transmission over the telephone network.

The network interface unit further includes a broadband communications option connected between the controller and the broadband network for receiving a broadband signal therefrom and for converting the received broadband signal into a digital signal useable by the controller. The controller causes the switching means to connect the broadband network to one of the customer equipment and the termination in response to the controller receiving a signal from one of the telephone and the broadband network. The controller responds to the broadband signal over (i) the other of the telephone network and broadband communications options or (ii) the one of the telephone and broadband network. The network interface unit has encryption key and unique address for selective communication therewith via at least one of the telephone and broadband network.

I have also invented a method of provision signals on a broadband line. In the method, a broadband control signal is provided on one of a telephone line or the broadband line. The broadband line is connected to one or more of a customer's equipment, a test circuit and a termination in response to the control signal. A response to the control signal is issued over one of the telephone line and the broadband line.

DETAILED DESCRIPTION OF THE PREFERRED EMBODIMENT

Figure 1:
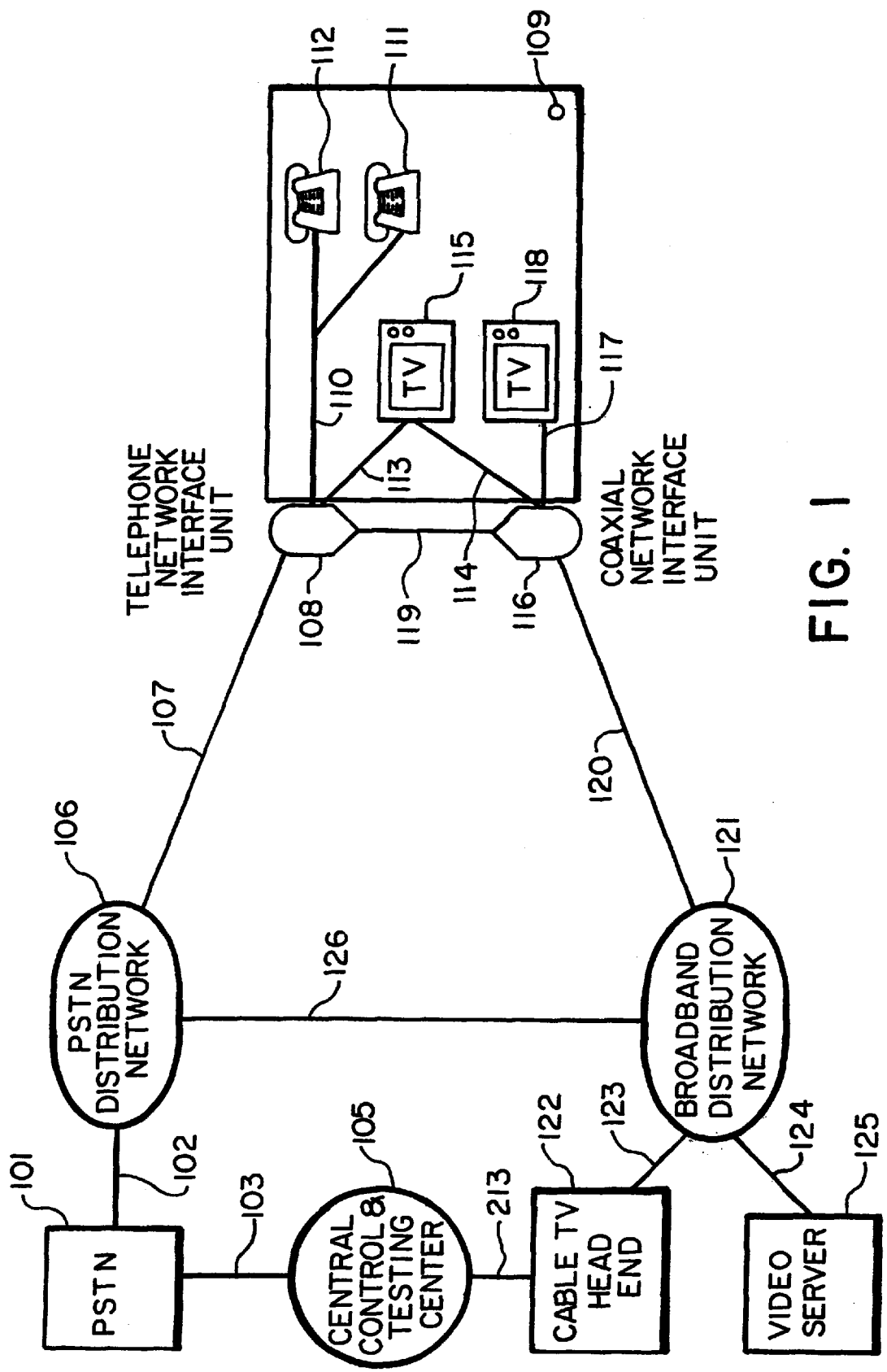
FIG. 1 is a block diagram of a broadband coaxial delivery system including a coaxial network interface unit in accordance with the present invention.

FIG. 1 is a block diagram showing a system of the present invention using a broadband coaxial delivery system and a public switched telephone network (PSTN). In particular, the PSTN 101 is shown to communicate with a PSTN distribution network 106 via telephone lines 102 or other telephone facilities. The PSTN 101 also communicates with a centralized control and testing center 105 via telephone lines 103. A subscriber location 109, such as a private residence, is connected to the PSTN distribution network 106 via telephone lines 107 which are connected to a telephone network interface unit 108 at the private residence 109. Inside the private residence 109, inside telephone wiring 110, 113 connects the telephone interface unit 108 to telephone instruments 111 and 112, and other devices, such as television 115.

In accordance with the present invention, a coaxial network interface unit 116, mounted at the private residence 109, is connected via inside coaxial wiring 114, 117 to television sets 115, 118, respectively, or other customer equipment such as a Video Cassette Recorder (VCR), set top decoder, cable modem and the like. The coaxial network interface unit 116 is also connected to the telephone network interface unit 108 via telephone lines 119 in order to provide the PSTN 101 access to the coaxial network interface unit 116.

The coaxial network interface unit 116 is connected to a broadband distribution network 121 via broadband line 120 or other broadband facilities, which in a preferred embodiment is coaxial cable. The broadband distribution network 121 may also be connected to one or a plurality of systems through a cable television head end 122 connected to the broadband distribution network 121 via broadband line 123. The cable television head end 122 is connected to the central control and testing center 105 for communication therewith via broadband line 213. The broadband distribution network 121 may also be connected to a video server 125 via broadband line 124. Moreover, the broadband distribution network 121 may be connected to the PSTN distribution network 106 via telephone lines 126. Other broadband subscriber locations (not shown) have similar connections to the PSTN 101 and the broadband distribution network 121.

Figure 2:
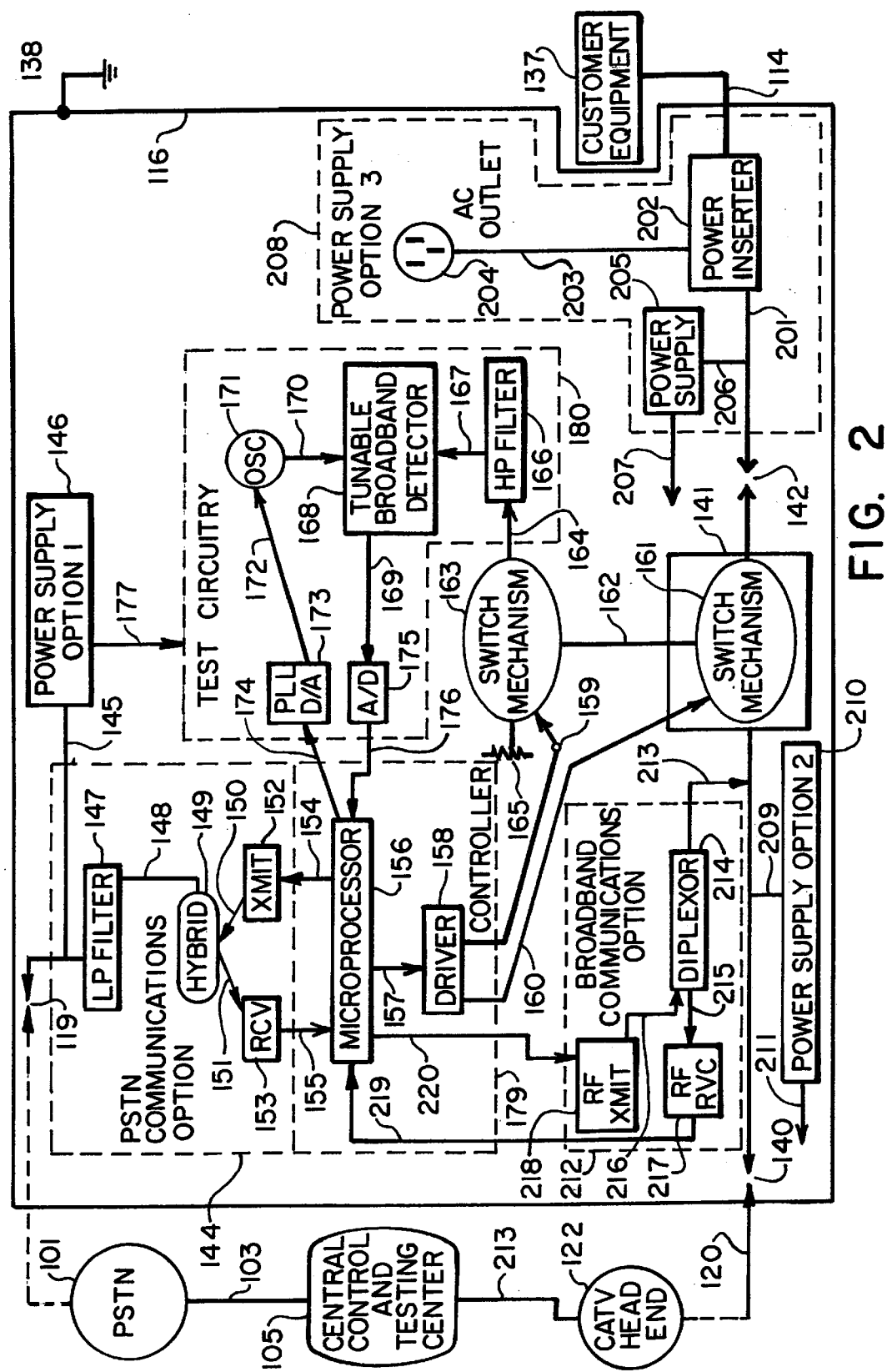
FIG. 2 is a schematic diagram of internal circuitry of the coaxial network interface unit of FIG. 1.

With reference to FIG. 2, and continuing reference to FIG. 1, each subscriber has customer equipment 137, such as a television 115 or other equipment, connected to the coaxial network interface unit 116 via inside coaxial cable 114. This equipment 137 may be equipped with circuitry designed for receiving signals in the forward direction from the broadband distribution network 121, and for transmitting signals in the reverse direction back to the broadband distribution network 121. In accordance with the present invention, a testing methodology is provided for measuring frequencies in both the forward and reverse direction and a switching methodology for enabling varying levels of service to the customer equipment and to enable or disable customer equipment reverse transmission into the broadband network. Access for measurement purposes is provided via switching device 141 connected between the broadband distribution network 121 and the customer equipment 137 via broadband line 120 and inside coaxial wiring 114. Frequencies of broadband signals from the broadband distribution network 121 are, without limitation, typically in the 45 to 1000 MHz range. In a preferred embodiment, the customer equipment 137 is capable of transmitting or receiving one or a plurality of signals to or from the broadband distribution network 121 via switching device 141.

Three options for powering the coaxial network interface device are illustrated. Option 1 derives power from the telephone lines 119. The individual circuits of the coaxial network interface unit 116 receive operating voltage from DC power provided to power supply 146 from the PSTN 101 via telephone lines 119 and leads 145. The power supply 146 receives the DC voltage on leads 145 and provides a local power output 177 for the logic, measurement and switching mechanism operations.

Option 2 derives power from the broadband line 120. In option 2, the individual circuits of the coaxial network interface unit 116 receive operating voltage from AC or DC power provided to power supply 210 from the broadband distribution network 121 via broadband line 120 and leads 209. The power supply 210 receives the provided AC or DC voltage and provides a local power output 211 for the logic, measurement and switching mechanism operations.

Option 3 derives power from a power utility outlet 204 at the private residence 109. The coaxial network interface unit 116 receives AC or DC voltage from the power utility outlet 204 via leads 203 fed through a power inserter 202 onto the coaxial leads 201. The power inserter 202 blocks power from the inside coaxial wiring 114 while providing for the bi-directional passing of broadband signals between the customer equipment 137 and switching device 141, via coaxial wiring 114 and coaxial leads 201. The AC or DC voltage impressed on the coaxial leads 201 is fed to the power supply 205 via leads 206. The power supply 205 provides a local power output 207 for the logic, measurement and switching mechanism operations.

The present invention may include one, or more of the above powering options to increase deployment flexibility. For safety purposes, all powering options incorporate grounding capability. Moreover, the coaxial network interface unit 116 is grounded to earth via bonding to the power utility ground or to a ground rod or other suitable ground via leads 138.

Two communications paths are available between the coaxial network interface unit 116 and the central control and testing center 105, resulting in three communications options.

The first option is command, control and data transfer solely over the PSTN 101. In this option, the telephone lines 107, 119, the PSTN distribution network 106 and the telephone network interface unit 108 are connected for carrying typical bidirectional telephone communications signals between the PSTN 101 and the coaxial network interface unit 116. The operation of the coaxial network interface unit 116 is controllable via signals received from the centralized control center 105 through the PSTN 101 on telephone lines 119.

In a preferred embodiment, the PSTN 101 is connected to a PSTN communications option 144 of coaxial network interface unit 116. The PSTN communications option 144 includes low pass filter 147, hybrid 149, receiver 153 and transmitter 152. Control signals to the PSTN communications option 144 sent by the PSTN 101 via telephone lines 119 are fed to the low pass filter 147. The output of the low pass filter 147 is sent via leads 148 to the hybrid 149 where the signals are split for transmit and receive. The hybrid 149 provides the analog telephone signals from the control and testing center 105 to the receiver circuitry 153 via leads 151. The receiver 153 converts the analog telephone signals to digital signals and provides the digital signals via leads 155 to a controller 179. The controller 179 includes microprocessor 156 for analyzing the incoming digital signals and acting thereon. Controller 179 also includes driver 158 to be discussed in greater detail hereinafter. Responses to the central control and testing center 105 are sent from the microprocessor 156 to the transmitter 152 via leads 154. The transmitter 152 converts the digital signals from the microprocessor 156 to an analog telephone signal format and sends the telephone signals via leads 150 to the hybrid 149 and through low pass filter 147 where the responses are sent back to the PSTN 101 and to the central control and testing center 105.

The second option is command, control and data transfer solely over the broadband line 120. In this option, the broadband line 120 and the broadband distribution network 121 are connected for carrying bi-directional broadband signals between the coaxial network interface unit 116 and the CATV head end 122 via broadband lines 123 and 120. The coaxial network interface unit 116 is controlled from the central control and testing center 105 via broadband control signals provided from the CATV head end 122. Control signals received by the coaxial network interface unit 116 from the central control and testing center 105 via the CATV head end 122 control the operation of the circuitry in the coaxial network interface unit 116.

In a preferred embodiment, control signals sent via the CATV head end 122 are fed to a broadband communications option 212 of coaxial network interface unit 116 via leads 213. The broadband communications option 212 includes a diplexer 214 wherein the control signals are split for transmit and receive. The diplexer 214 routes control signals from leads 213 to RF receiver 217 via leads 215. The receiver 217 converts the broadband signals sent from the central control and testing center 105 to digital signals and sends the digital signals via leads 219 to the microprocessor 156 wherein the incoming communications are analyzed and acted upon. Responses to the central control and testing center 105 are sent from the microprocessor 156 via leads 220 to a transmitter 218. The transmitter 218 converts these digital signals to broadband format and sends them via leads 216 to the diplexer 214 where the responses are sent back via leads 213 and broadband line 120 to the CATV head end 122 and to the central control and testing center 105.

The third option is command, control and data transfer from the central control and testing center 105 to the coaxial network interface unit 116 over one of the broadband line 120 or the telephone lines 107 with a return path from the coaxial network interface unit 116 to the central control and testing center 105 being provided over the other one of the broadband line 120 and the telephone lines 107. In a preferred embodiment, the broadband distribution network 121 routes broadband signals from the CATV head end 122 to the coaxial network interface unit 116 via broadband line 120. A return path from the coaxial network interface unit 116 is provided to the central control and testing center 105 through the PSTN 101 via telephone lines 107. The coaxial network interface unit 116 is controlled from the central control and testing center 105 via broadband control signals transmitted on broadband line 120. Alternatively, the control signals are provided to the coaxial network interface unit 116 via the telephone line 107 with a return path being provided via broadband line 120.

Broadband control signals sent via broadband line 120 are fed through a first switch mechanism 161 of switching device 141 and on to a second switch mechanism 163 via leads 162. Switching mechanisms 161, 163 route the control signals to test circuitry 180 via leads 164. Test circuitry 180 includes high pass filter 166, tunable band detector 168, A/D converter 175, phase-locked loop (PLL) D/A converter 173 and oscillator (OSC) 171. The broadband control signals from switch mechanism 163 are routed to the high pass filter 166 and to the tunable broadband detector 168 via leads 167. This path is the same as the measurement path which will be described in further detail hereinafter. The tunable broadband detector 168 is tuned to the frequency of the control signals and demodulates the control signals to baseband levels that are sent via leads 169 to A/D converter 175 for digitization and reception at the microprocessor 156 of the controller 179 via leads 176 where the incoming communications are analyzed and acted upon. Responses to the broadband control signals are sent from the microprocessor 156 via leads 154 to the transmitter 152 of the PSTN communications option 144. The transmitter 152 converts these digital signals to an analog telephone signal format and sends the telephone signals via leads 150 to the hybrid 149 and through low pass filter 147 where the responses are sent back into the PSTN 101 and to the central control and testing center 105. Alternatively, the microprocessor 156 of controller 179 responds to the broadband control signals via the broadband communications option 212 in the manner set forth above in conjunction with the second communications option.

An encryption key and unique address for each coaxial network interface unit 116 on a broadband network may also be provided to enhance security in the broadband network. By providing an encryption key and unique address for each coaxial network interface unit 116, command, control and data transfer cannot easily be interpreted and modified. The central control and testing center 105 may also provide the appropriate commands to enable manual or automatic sequencing of coaxial network interface unit 116 testing and provisioning activities.

Switching device 141 contains the first switching mechanism 161 under the control of microprocessor 156. In a preferred embodiment, the microprocessor 156 sends commands to a driver 158 via leads 157 to actuate the switching mechanism 161 via leads 160. The switching mechanism 161 is connected via leads 162 to the second switching mechanism 163, which is also controlled by the microprocessor 156. Control signals from the microprocessor 156 are sent via leads 157 to the driver 158 to actuate the switching mechanism 163 via leads 159.

Switching mechanisms 161 and 163, together, provide access capabilities for both testing and provisioning. Switching mechanisms 161, 163 may be implemented with mechanical relays or with solid state devices.

The provisioning capabilities of the coaxial network interface device are controlled by the microprocessor 156 under the command of the central control and testing network center 105 as set forth above. To enable a service grade or to impose a reverse transmission filter, the central control and testing center 105 issues a command to the microprocessor 156 to set the switching mechanism 161 to route the appropriate level of service and/or filtering from the broadband distribution network 121 through the switching mechanism 161 to the customer's inside wiring 114, 117. To disable service, the central control and testing center 105 issues a command to the microprocessor 156 to set the switching mechanisms 161 and 163 to route the connection from the broadband distribution network 121 through the other leg of the switching device 141, to the 75 ohm termination 165, as illustrated in FIG. 2.

The testing capabilities of the coaxial network interface unit 116 are controlled by the microprocessor 156 under the command of the central control and testing center 105, as previously detailed. To engage in testing, the central control and testing center 105 issues a command to the microprocessor 156 to set the switching mechanisms 161 and 163 so that a path is formed between the test circuitry 180 and either the broadband line 120 or the customer's inside wiring 114.

Frequencies from, without limitation, 5 MHz to 1000 MHz are presentable to the tunable broadband detector 168 from the high pass filter 166 via leads 167. The tunable detector 168 then performs measurements on the signals presented on leads 167. The output of the tunable detector 168 is connected via leads 169 to an analog-to-digital (A/D) converter 175. The A/D converter 175 then sends digital information to the microprocessor 156 via leads 176 for analysis and processing. Based upon software controlling the microprocessor 156, the measurements are converted into signals which are fed from the microprocessor 156 to transmitter 152 or transmitter 218 via leads 154 or 220 for transmission back into the central control and testing center 105, as previously described. To perform measurements across the frequency band from 5 MHz to 1000 MHz, a voltage controlled oscillator OSC 171 is provided under the control of the microprocessor 156. Signals from the microprocessor 156 are sent via leads 174 to the PLL D/A converter 173 which sends a difference voltage via leads 172 to the OSC 171 to change frequency selection. The output frequency from the OSC 171 is fed via leads 170 to tunable broadband detector 168.

Measurements performed by the tunable detector 168 include measuring signal quality, such as, without limitation, signal levels, carrier-to-noise ratios, intermodulation, hum, AC voltage, DC voltage, resistance or capacitance.

Figure 3:
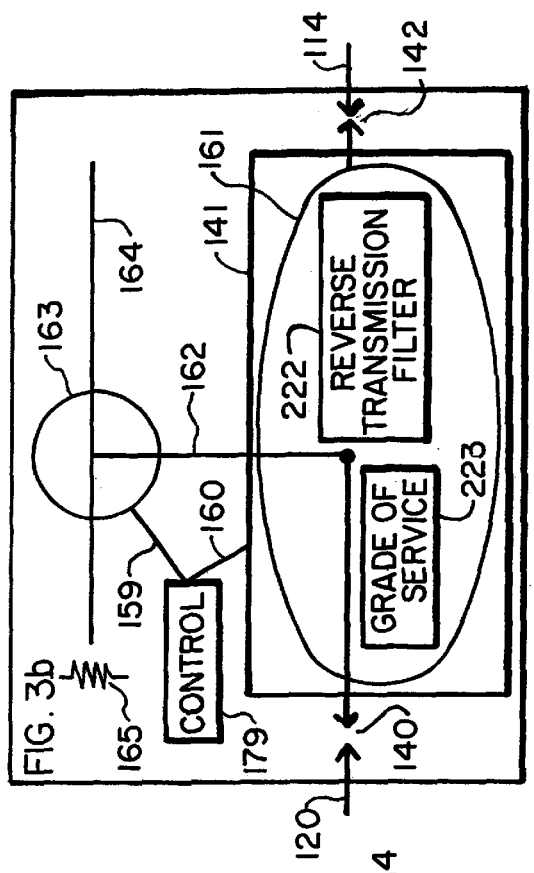
FIGS. 3A–3C are schematic diagrams showing provisioning service states of the coaxial network interface unit of FIG. 2.
Figure 3:
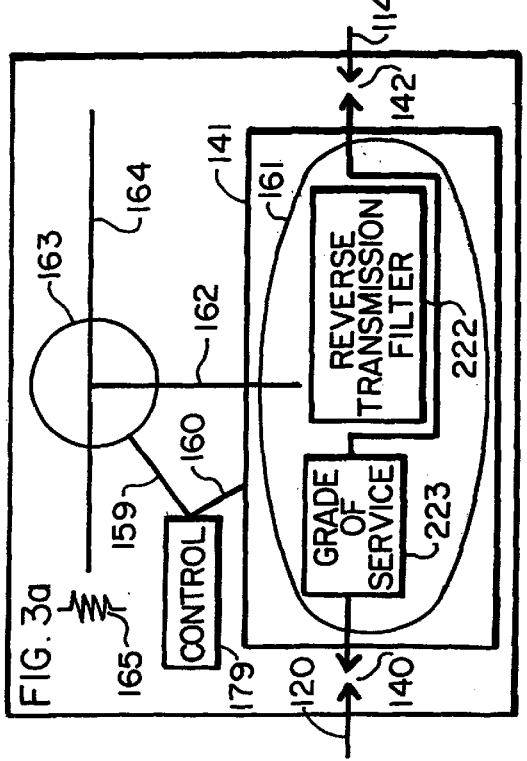
Figure 3:
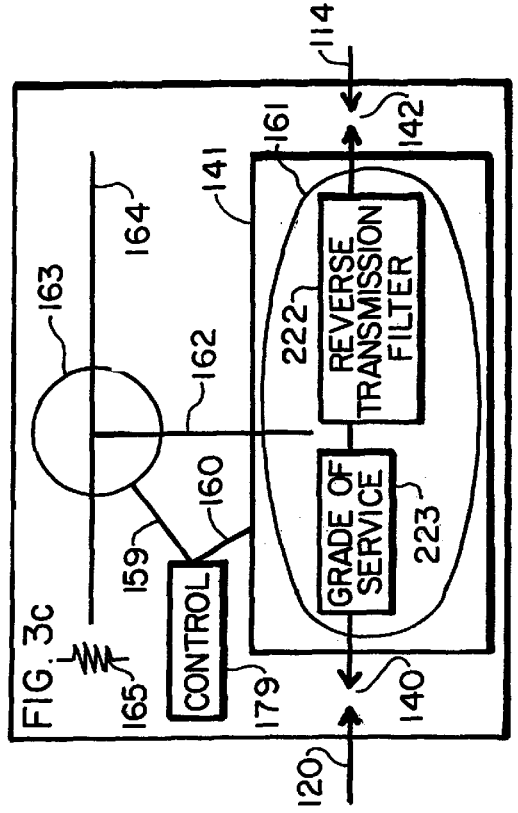

With reference to FIGS. 3A–3C, and continuing reference to all previous Figures, the provisioning states for the coaxial network interface device are illustrated. In FIG. 3A, the broadband line 120 is connected to the switching device 141 via connector 140 and the inside wiring 114 is connected to the switching device 141 via connector 142. To enable a service option, the central control and testing center 105 issues a command to the coaxial network interface unit 116 to set the switching mechanism 161 so that signals on broadband line 120 pass through a grade of service device 223, associated with switching device 141, to the customer's inside wiring 114. Also shown, but not connected in this service state, are the paths to the 75 ohm termination 165, the leads 164 to the test circuitry 180 and a reverse transmission filter 222. In this service state, two-way transmission between the customer's equipment 137 and the CATV head end 122 is provided.

In FIG. 3B, to disable service, the central network control and testing center 105 issues a command to the coaxial network interface unit 116 to set the switching mechanisms 161 and 163 so that a broadband signal on the broadband line 120 is routed to the other leg of the switching device 141 through leads 162 to the second switching mechanism 163. The second switching mechanism 163 is set to route the broadband signal to the 75 ohm termination 165. In this service state, the customer's equipment 137 is isolated from the broadband line 120 and appropriate electrical termination is provided for the broadband line 120.

In FIG. 3C, to enable a service option with reverse transmission filtering, the central control and testing center 105 issues a command to the coaxial network interface unit 116 to set the switching mechanism 161 so that the broadband line 120 is connected to the inside wiring 114 via the grade of service device 223 and the reverse transmission filter 222, embedded in the switching device 141. Also shown, but not connected in this service state, are the paths to the 75 ohm termination 165 and the leads 164 to the test circuitry 180. In this service state, one-way transmission from the CATV head end 122 to the customer's equipment 137 is provided.

Figure 4:
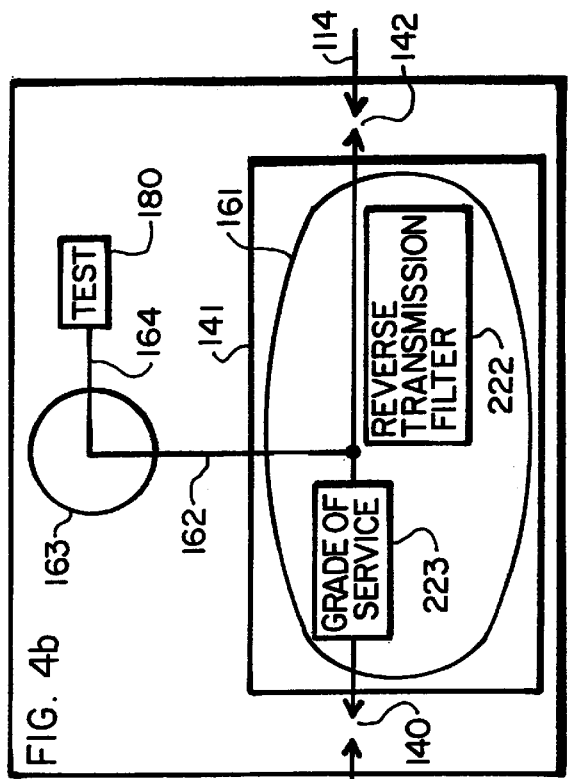
FIGS. 4A–4C are schematic diagrams showing testing states of the coaxial network interface unit of FIG. 2.
Figure 4:
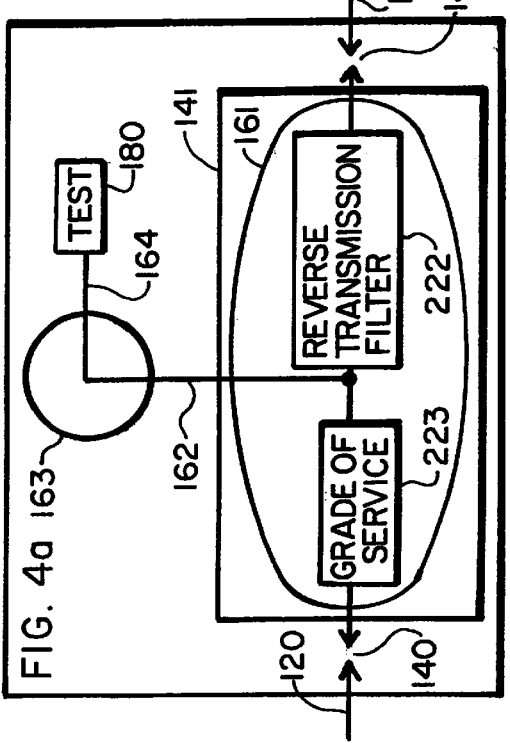
Figure 4:
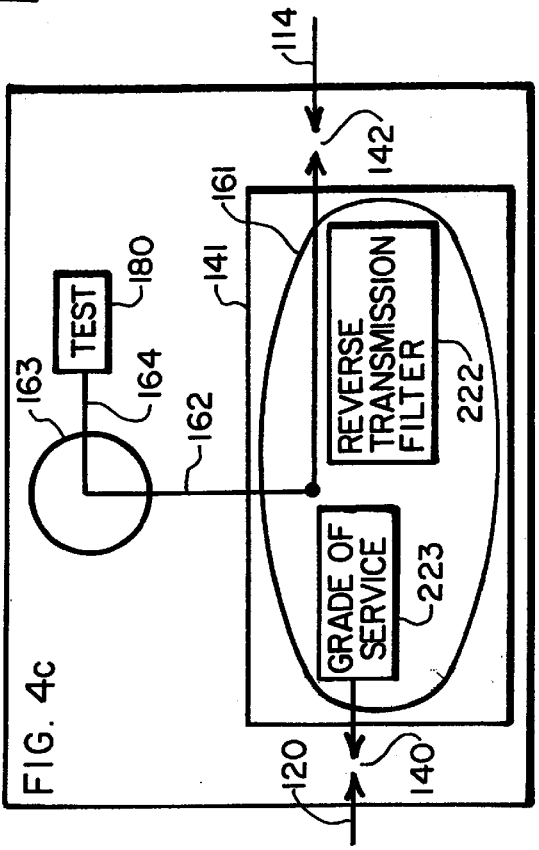

With reference to FIGS. 4A–4C, the testing states of the coaxial network interface device are illustrated. In FIG. 4A, the switching mechanism 161 is set to route a signal on the broadband line 120 through the grade of service device 223, to the second switching mechanism 163 via leads 162. The second switching mechanism 163 is set to route the signal to test circuitry 180 which measures the quality of signals on the broadband line 120.

In FIG. 4B, the first switching mechanism 161 is set to connect the broadband line 120 to the grade of service device 223 which, in turn, is connected to the inside wiring 114 and the second switching mechanism 163. As above, the grade of service device 223 is utilized to provide an appropriate service option. In this state, the second switching mechanism 163, fed by leads 162, routes signals from grade of service device 223 to the test circuitry 180. In this manner, testing can be accomplished on an in-service basis and measurements can be taken on the two-way transmissions between the customer's equipment 137 and the CATV head end 122.

In FIG. 4C, the switching mechanism 161 is set to route a signal from the inside wiring 114 to the second switching mechanism 163 through leads 162. Switching mechanism 163 is set to route the signal to the test circuitry 180. In this manner, the test circuitry 180 can measure the quality of signals sent on inside wiring 114 by customer equipment 137.

Figure 5:
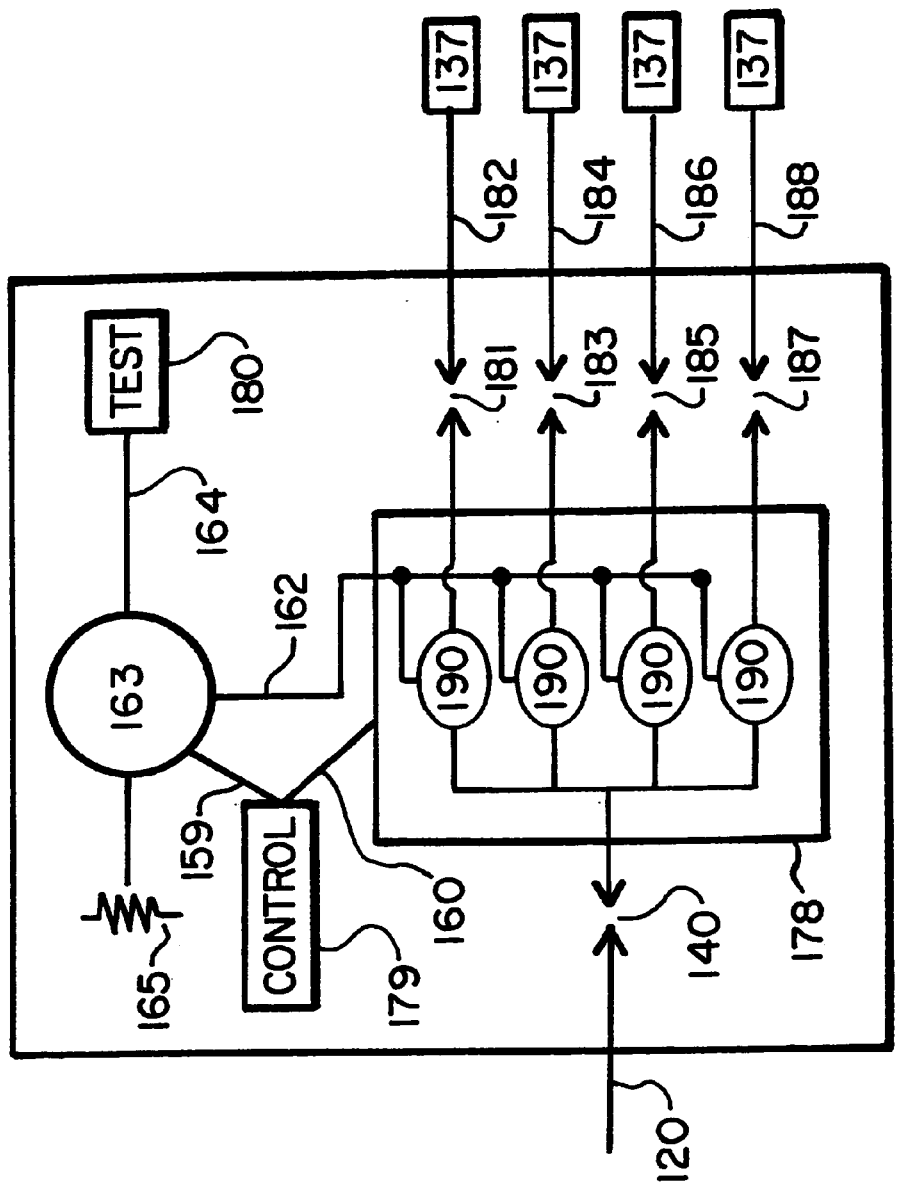
FIG. 5 is a schematic view of the coaxial network interface unit of FIG. 2 including a switching device having a plurality of switching mechanisms for test access and allowing or denying delivery of signals between the broadband coaxial network and a plurality of customer equipment.

With reference to FIG. 5 and continuing reference to FIGS. 1 and 2, in an embodiment of the invention, the broadband line 120 serves a multi-residence, wherein each subscriber has customer equipment 137. In FIG. 5, four subscribers are shown for illustrative purposes only. Each of the customer equipment 137 is equipped with circuitry designed for receiving signals in the forward direction from the broadband line 120, and for transmitting signals in the reverse direction back to the broadband line 120 via their respective coaxial wiring 182, 184, 186 and 188. In accordance with the present invention, the above testing methodology is provided to measure frequencies in both the forward and reverse direction for any of the subscriber connections. Access for measurement purposes is provided via switching device 178 which is connected to the broadband line 120 via connector 140. The switching device 178 is connected to all of the respective subscriber's inside coaxial wiring 182, 184, 186 and 188 via connectors 181, 183, 185 and 187.

The switching device 178 contains switching mechanisms 190 under the control of the controller 179. The controller 179 sends commands to actuate the switching mechanisms 190 via leads 160. Control signals can individually control each connection to multiple subscribers. The switching mechanisms 190 are connected via leads 162 to second switching mechanism 163 which is also controlled by the controller 179. Control signals are sent from the controller 179 to actuate the second switching mechanism 163 via leads 159.

The provisioning and testing capabilities of the multi-residence, coaxial network interface device are controlled by one of the communications options previously described under the command of the central control and testing center 105. To enable a grade of service option or reverse transmission filter, the central control and testing center 105 issues a command to the coaxial network interface unit 116 to set a selected switching mechanisms 190 so that a signal on the broadband line 120 is routed through the grade of service 223 and/or reverse transmission filter 222, associated with the corresponding switching mechanism 190, through the switching device 178, and to the selected customer's coaxial wiring 182, 184, 186 and 188. To disable service, the central control and testing center 105 issues a command to the controller 179 to set a selected switching mechanism 190 and second switching mechanism 163 so that a signal from the broadband line 120 is routed to the 75 ohm termination 165.

To engage in testing, the central control and testing center 105 issues a command to the coaxial network interface unit 116 to set a switching mechanism 190 and second switching mechanism 163 so that a signal from either one or both of the broadband line 120 or the customer's coaxial wiring 182, 184, 186 or 188 is routed through the switching device 178 through the second switching mechanism 163, via leads 164 to the test circuitry 180.

The features of the present invention provide operational and cost advantages for coaxial network operators. The ability to remotely control and test a coaxial based network via either the PSTN or broadband network allows a network operator to minimize craftsperson dispatches for connecting and disconnecting service, selective service optioning, power supply monitoring, return path filtering and to remotely analyze and sectionalize troubles instead of sending a craftsperson to find the source of the problem. These centralized and remote capabilities have the potential to greatly impact expense control. Additionally, the remote provisioning capability of this present invention provides for the prevention of illegal theft of coaxial signals from the network.

While specific embodiments of the invention have been described in detail, it will be appreciated by those skilled in the art that various modifications and alternatives to those details could be developed in light of the overall teachings of this disclosure. The preferred embodiments described herein are meant to be illustrative only and not limiting as to the scope of the invention which is to be given the full breadth of the appended claims and any and all equivalents thereof.

What is claimed is:

1. A provisioning and control apparatus for use in a communications system, the apparatus comprising:

a first network interface unit connected between a first communication network and an end use device via a first transmission medium, with the first network interface unit facilitating communication between the first communication network and the end use device via the first transmission medium;

a second network interface unit connected between a second communication network and the end use device via a second transmission medium, with the second network interface unit facilitating communication between the second communication network and the end use device via the second transmission medium, with the second network interface unit connected between the second communication network and the first network interface unit via the second transmission medium, with the second network interface unit facilitating communication between the second communication network and the first network interface unit via the second transmission medium; and a central control and testing center connected between the first and second communication networks for transmitting and receiving a signal utilizing at least one of the first and second transmission mediums, the first network interface unit including means for receiving the signal from the central control and testing center on one of the first and second transmission medium and for responding thereto by transmitting a response signal to the central control and testing center utilizing the other of the first and second transmission medium.

2. The apparatus set forth in claim 1 wherein the first network interface unit further includes means for receiving the signal on one of the first and second transmission medium and for responding thereto utilizing the one of the first and second transmission medium.

3. The apparatus as set forth in claim 1 wherein the first transmission medium is coaxial wire and wherein the second transmission medium is telephone wire.

4. The apparatus as set forth in claim 1 wherein the end use device includes a transceiver for facilitating communication between the end use device and at least one of the first and second communication networks.

5. The apparatus as set forth in claim 1 wherein the first network interface unit further includes a termination and a means for connecting the first communication network to one of the end use device and the termination in response to receipt of a control signal transmitted on one of the first and second transmission medium.

6. The apparatus set forth in claim 5 wherein the first network interface unit further includes a grade of service device that is connectable between the first communication network and the end use device in response to the control signal.

7. The apparatus as set forth in claim 6 wherein the first network interface unit further includes a reverse transmission filter that is connectable between the first communication network and the end use device in response to the control signal.

8. The apparatus as set forth in claim 4 wherein the first network interface unit further includes a test circuit for testing the quality of signals from at least one of the first communication network and the end use device, and with the test circuit connectable to at least one of the first communication network and the end use device in response to a control signal.

9. The apparatus as set forth in claim 8 wherein a grade of service device is connectable between the first communication network and at least one of the test circuit and the end use device in response to the control signal.

10. A network interface unit for connection between a telephone network and a broadband network, the network interface unit comprising:

a telephone communication circuit for transmitting and receiving telephone signals to and from the telephone network and for converting received telephone signals to digital signals;

a broad communication circuit for transmitting and receiving broadband signals to and from the broadband network and for converting received broadband signals to digital signals;

a controller connected between the telephone communication circuit and the broadband communication circuit for receiving the digital signals from at least one of the telephone network communication circuit and the broadband network communication circuit; and a switching means connected to the controller and the broadband network, the controller including means for causing the switching means to one of connect and disconnect the broadband network to and from equipment in response to the receipt of a control signal by at least one of the telephone communication circuit and the broadband network communication circuit.

11. The network interface unit as set forth in claim 10 further including a termination connected to the switching means, the controller including means for causing the switching means to connect the broadband network to one of the termination and the equipment in response to the controller receiving the control signal.

12. The network interface unit as set forth in claim 10 further including a test circuit connected between the controller and the switching means, the controller including means for causing the switching means to connect the test circuit to at least one of the broadband network and the equipment in response to the receipt of the control signal, the test circuit converting a signal from the at least one of the broadband network and the equipment into a digital signal for use by the controller.

13. The network interface unit as set forth in claim 12 further including means for selecting a frequency of the signal on the broadband network to be converted into the digital signal.

14. The network interface unit as set forth in claim 12 wherein the controller includes means for causing the switching means to isolate the equipment from the broadband network and the test circuit.

15. The network interface unit as set forth in claim 12 wherein the controller responds to the digital signal by causing a response signal to be generated to one of the telephone network and the broadband network.

16. The network interface unit as set forth in claim 12 wherein the controller includes:

means for transmitting digital signals to the telephone communication circuit wherein the digital signals are converted into telephone signals for transmission over the telephone network; and means for transmitting digital signals to the broadband communication circuit wherein the digital signals are converted into broadband signals for transmission over the broadband network.

17. The network interface unit as set forth in claim 16 wherein the controller receives a signal from one of the telephone network and the broadband network and responds thereto via one of the telephone network and the broadband network.

18. The network interface unit as set forth in claim 10 further including at least one of (i) a first power supply circuit connected for receiving operating voltage from the telephone network; (ii) a second power supply circuit connected for receiving operating voltage from the broadband network; and (iii) a third power supply circuit connected for receiving power from a power utility outlet.

19. The network interface unit as set forth in claim 18 wherein the third power supply circuit includes a power inserter and power supply, the power inserter connected to the broadband network between the switching means and the equipment, and a power supply connected to the broadband network between the power inserter and the switching means, with the power inserter providing power to the power supply and blocking power to the equipment, and with the power inserter further providing a path for broadband signs between the switching means and the equipment.

20. The network interface unit as set forth in claim 10 further including an encryption key and unique address for selective communication therewith via at least one of the telephone network and the broadband network.

21. The network interface unit as set forth in claim 10 wherein a plurality of equipment is connected to the switching means, and the controller causes the switching means to selectively connect one or more of the plurality of equipment to the broadband network in response to the controller receiving the control signal.

22. The network interface unit as set forth in claim 21 further including a test circuit and a termination connector to the switching means, the switching means selectively connecting one of the plurality of equipment to one of the test circuit and the termination in response to the controller receiving the control signal.

* * * * *

UNITED STATES PATENT AND TRADEMARK OFFICE
CERTIFICATE OF CORRECTION

PATENT NO. : 5,982,412
DATED : November 9, 1999
INVENTOR(S) : Gregory M. Nulty

It is certified that error appears in the above-identified patent and that said Letters Patent is hereby corrected as shown below:

Column 1 Line 54 "chum rate" should read --churn rate--.

Column 5 Line 56 "bidirectional" should read --bi-directional--.

Claim 10, Column 12 Line 13, "telephone communication" should read --telephone network communication--.

Claim 19, Column 13 Line 5, "broadband signs" should read --broadband signals--.

Claim 22, Column 14 Line 6, "connector to" should read --connected to--.

Signed and Sealed this

Twenty-second Day of August, 2000

Attest:

Q. TODD DICKINSON

*Attesting Officer*      *Director of Patents and Trademarks*